United States Patent
Rajakarunanayake et al.

(10) Patent No.: US 9,350,824 B2
(45) Date of Patent: May 24, 2016

(54) SOCIAL DEVICE SERVICE AND SUPPORT VIA AUTOMATIC GROUP ASSOCIATION

(75) Inventors: Yasantha N. Rajakarunanayake, San Ramon, CA (US); Jeyhan Karaoguz, Irvine, CA (US); Wael William Diab, San Francisco, CA (US); James D. Bennett, Hroznetin (CZ); Harry S. Tyson, Jr., Austin, TX (US)

(73) Assignee: Broadcom Corporation, Irvine, CA (US)

( * ) Notice: Subject to any disclaimer, the term of this patent is extended or adjusted under 35 U.S.C. 154(b) by 185 days.

(21) Appl. No.: 13/603,453

(22) Filed: Sep. 5, 2012

(65) Prior Publication Data
US 2013/0091216 A1   Apr. 11, 2013

Related U.S. Application Data

(60) Provisional application No. 61/545,147, filed on Oct. 8, 2011.

(51) Int. Cl.
| | |
|---|---|
| H04L 29/08 | (2006.01) |
| G06Q 50/00 | (2012.01) |
| H04W 4/12 | (2009.01) |
| G06Q 10/10 | (2012.01) |
| H04W 4/20 | (2009.01) |

(52) U.S. Cl.
CPC ............ *H04L 67/306* (2013.01); *G06Q 10/101* (2013.01); *G06Q 50/01* (2013.01); *H04L 67/125* (2013.01); *H04W 4/206* (2013.01); *H04L 67/303* (2013.01)

(58) Field of Classification Search
CPC .... G06Q 50/01; H04L 67/306; H04L 67/125; H04W 4/206
See application file for complete search history.

(56) References Cited

U.S. PATENT DOCUMENTS

| | | | |
|---|---|---|---|
| 2005/0233693 A1* | 10/2005 | Karaoguz et al. | 455/3.06 |
| 2009/0292814 A1* | 11/2009 | Ting et al. | 709/229 |
| 2010/0035597 A1* | 2/2010 | Rao | 455/419 |

(Continued)

FOREIGN PATENT DOCUMENTS

| | | |
|---|---|---|
| EP | 1971163 A2 | 9/2008 |
| TW | 201129043 A1 | 8/2011 |

OTHER PUBLICATIONS

European Patent Office; European Search Report; EP Application No. 12006974.5; Mar. 22, 2013; 3 pgs.

*Primary Examiner* — Joe Chacko
(74) *Attorney, Agent, or Firm* — Garlick & Markison; Bruce E. Garlick

(57) ABSTRACT

A social networking system offers a variety of device service and support functions via automated social network (SNET) group associations. Such functions can include, for example, device registration and warranty services, update and upgrade services, maintenance and testing services, resource utilization reporting services, cloning services, usage tutorials and user group interactions, targeted advertising, etc. In various embodiments, support services may be offered upon automated docking of a social device with a SNET group, such as a manufacturer's SNET group. Selection of available services may be automated based on device profile data. Alternatively, services may be manually selected through a user interface provided by a member device or support service. In other embodiments, all or portions of a first device may be cloned on a second device, either on a persistent or temporary basis.

20 Claims, 12 Drawing Sheets

(56) References Cited

U.S. PATENT DOCUMENTS

| | | | |
|---|---|---|---|
| 2010/0169789 A1* | 7/2010 | Cheng et al. | 715/738 |
| 2011/0060994 A1* | 3/2011 | Maxwell et al. | 715/730 |
| 2011/0258303 A1* | 10/2011 | Nath | G06F 9/468 709/223 |
| 2012/0142310 A1* | 6/2012 | Pugh | H04L 41/0893 455/406 |
| 2012/0215865 A1* | 8/2012 | Sacks et al. | 709/206 |
| 2013/0059534 A1* | 3/2013 | Sobalvarro et al. | 455/41.1 |
| 2013/0091551 A1* | 4/2013 | Rajakarunanayake et al. | 726/4 |
| 2013/0091582 A1* | 4/2013 | Chen et al. | 726/26 |

* cited by examiner

Social Networking Grouping Hierarchy 400

SOCIAL DEVICE SERVICE AND SUPPORT VIA AUTOMATIC GROUP ASSOCIATION

CROSS REFERENCE TO RELATED PATENTS/PATENT APPLICATIONS

Provisional Priority Claim

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/545,147, entitled "Social Network Device Memberships and Resource Allocation," filed Oct. 8, 2011.

BACKGROUND OF THE INVENTION

1. Technical Field of the Invention

The invention relates generally to social networking; and, more particularly, it relates to social network device registration, service and support via group associations.

2. Description of Related Art

The popularity and growth of social network sites and services has increased dramatically over the last few years. Present social network sites include Facebook, Google+, Twitter, MySpace, YouTube, LinkedIn, Flicker, Jaiku, MYUBO, Bebo and the like. Such social networking (SNET) sites are typically web-based and organized around user profiles and/or collections of content accessible by members of the network. Membership in such social networks is comprised of individuals, or groupings of individuals, who are generally represented by profile pages and permitted to interact as determined by the social networking service.

In many popular social networks, especially profile-focused social networks, activity centers on web pages or social spaces that enable members to view profiles, communicate and share activities, interests, opinions, status updates, audio/video content, etc., across networks of contacts. Social networking services might also allow members to track certain activities of other members of the social network, collaborate, locate and connect with existing friends, former acquaintances and colleagues, and establish new connections with other members.

Individual members typically connect to social networking services through existing web-based platforms via a computing device, tablet or smartphone. Members often share a common bond, social status, or geographic or cultural connection with their respective contacts. Smartphone and games-based mobile social networking services are examples of rapidly developing areas.

In so-called "cloud" computing, computing tasks are performed on remote computers/servers which are typically accessed via Internet connections. One benefit of cloud computing is that may reduce the relative processing and storage capabilities required by user devices (e.g., a cloud computer may load a webpage accessed by a tablet device and communicate only required information back to the tablet). Accordingly, recent years have witnessed an ever-growing amount of content and application software being migrated from local or on-site storage to cloud-based data storage and management. Such software functionality/services and content are typically available on-demand via (virtualized) network infrastructures.

DETAILED DESCRIPTION OF THE INVENTION

Figure 1:
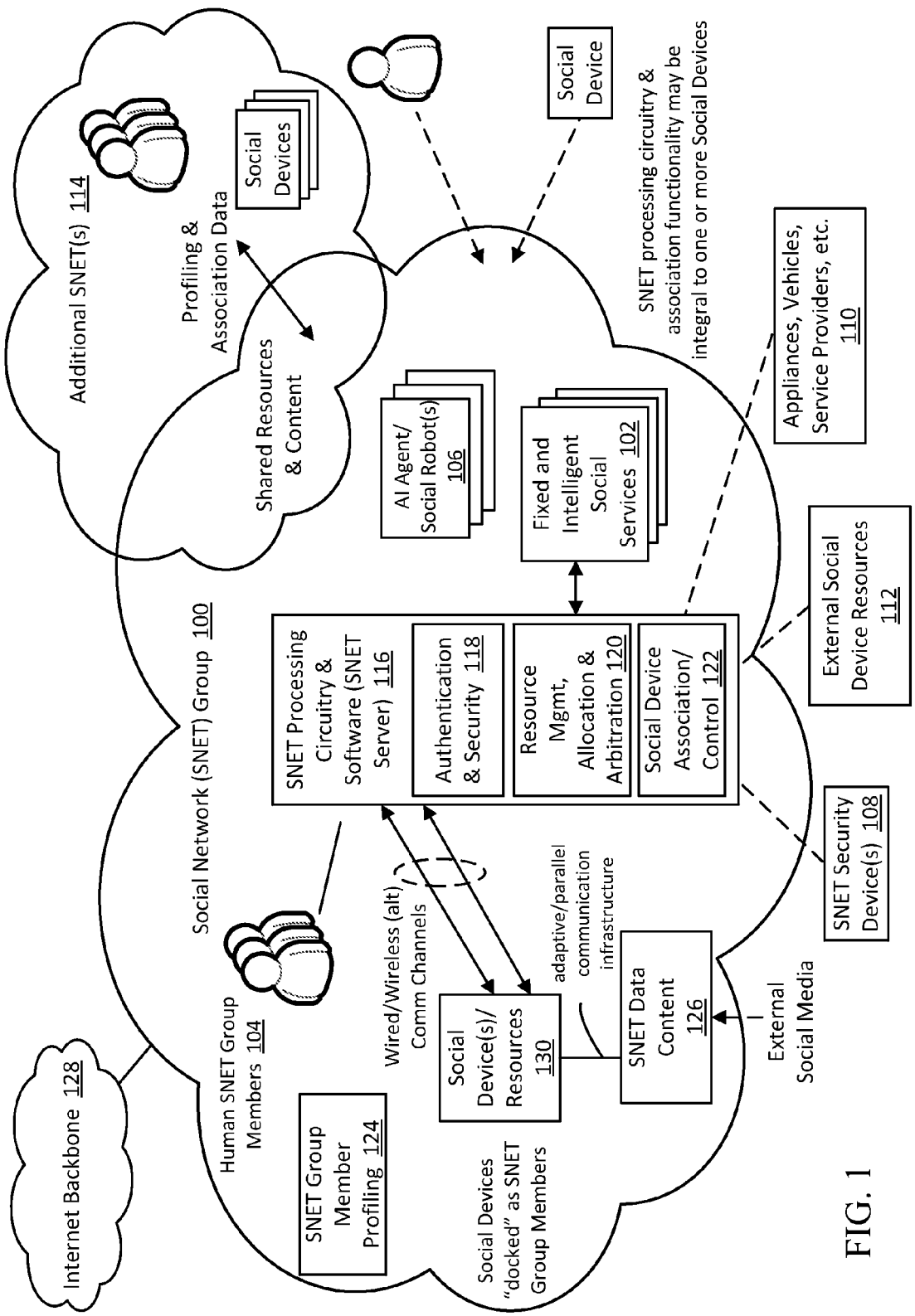
FIG. 1 illustrates a social network group comprising social services and devices in accordance with an embodiment of the disclosure.

As used herein, the terms "social network" and "SNET" comprise a grouping or social structure of devices and/or individuals, as well as connections, links and interdependencies between such devices and/or individuals. Members or actors (including devices) within or affiliated with a SNET may be referred to herein as "nodes", "social devices", "SNET members", "SNET devices", "user devices" and/or "modules". In addition, the terms "SNET circle", "SNET sub-circle", "SNET group" and "SNET sub-group" generally denote a social network that comprises social devices and, as contextually appropriate, human SNET members and personal area networks ("PANs").

Briefly, various novel approaches are presented herein for servicing and supporting social devices, including through automatic SNET group association processes. Such processes may comprise, for example, automatically offering (upon docking of a device to a user account in a SNET) device registration, service support, user-to-user interaction, updates, etc., via the SNET group. Currently, such services and activities are typically performed manually, without a common infrastructure, and therefore often do not occur or do not occur in a timely manner.

In one exemplary method for providing such services through SNET group association, upon activating or docking a new user device, the user's account information is provided to the SNET group automatically or via a setup-up prompt. Next, the device receives an offer to auto-join the SNET group, such as a manufacturer's SNET group specific to a particular device model. Acceptance of the offer adds or docks the device as a member to one or more of an operator's or manufacturer's SNET groups to provide, for example: access to registration/warranty/rebate information and extended warranty offers; testing, update, and service offerings; usage tutorials and user group interactions; periodic testing, configuration analysis, and ad hoc updates and upgrades; targeted advertising; tracking of in-service devices; detection of service problems, etc. Certain groups may similarly include offerings such as rebate information, coupons, forums, Twitter, Skype and/or various social media capabilities, and the like. User devices may be configured, manually or through factory-staged settings and security, to delegate membership control to a SNET or SNET group.

For many user devices, operations such as initial setup, reconfiguration, driver and application maintenance and installation, media and data management, etc., often prove to be very difficult and time consuming. Such operations may pose a significant barrier for certain device users, such as the elderly or children. In one embodiment, a user may rely on assistance from others by granting access to a device to, for example, a technical support group or friends group for purposes of device setup, maintenance and management. Relevant groups may include a trouble-shooting group, IT help group (providing, e.g., data backup or application installation support), theme support group, advertising group, storage management group, monitoring group (e.g., a baby monitor device accessible by family members or caregivers), etc. A user's profile information and device capabilities and/or access views may be visible to such groups.

In an alternate embodiment (described more fully in conjunction with FIG. 9), a user device is effectively "cloned" by another user via a SNET group. In yet another embodiment of the disclosure, a SNET and social device are configured to detect, monitor and/or report the usage of certain technology and media for purposes of establishing an independent basis for royalty assessment. Various other novel features are described herein.

Referring more specifically to FIG. 1, a social network group/circle 100 (hereinafter "SNET group" or "SNET circle") comprising fixed and intelligent social services 102 is shown. Briefly, membership in the SNET group 100 may comprise fixed and intelligent social services 102, docked social devices/resources 130 (embodiments of which are described in conjunction with FIGS. 6, 11 and 12) and human SNET group members 104, as well as proxies thereof. Further, SNET group 100 nodes may include support services and software (e.g., applications) of various types participating as members. By way of example, SNET group members might include artificial intelligence agents/social robots 106, SNET security device(s) 108, appliances, vehicles and service providers 110, external social device resources 112, common or authorized members/functionality of other SNET groups, etc. Further, access to specific content and resources of a SNET group 100 may be shared with members of additional SNET(s) 114, including remote or web-based applications. Such access can be conditioned on acceptable profiling and association data. Similarly, social devices or individuals may be granted temporary or ad hoc memberships, with or without restricted access.

In the illustrated embodiment, formation, maintenance and operation of SNET group 100 is performed by standalone or distributed SNET processing circuitry and software 116. It is noted that the "SNET processing circuitry" may comprise hardware, software, applications, or various combinations thereof, and be configurable to support various functionalities disclosed herein. Further, the SNET processing circuitry 116 may be included in a standalone server, server farm, cloud-based resources, and/or the various types of devices described below, and incorporate authentication and security functionality 118. In addition, specialized middleware may also be utilized by SNETs according to the disclosure, including standardized middleware and/or standardized communication protocols having an associated certification process. Interactions and interdependencies within the SNET group 100 may involve one or more of an adaptive resource management, allocation and arbitration module 120, a social device association/control module 122 or docking service, and a SNET group member profiling module 124.

As described more fully below, distribution of internal and external SNET data content 126 can be accomplished in a variety of ways in accordance with various embodiments of the disclosure. For example, data distribution may involve an adaptive or parallel network communication/routing infrastructure involving a wide variety of communication protocols and wired and/or wireless communications channels, as well as one or more social devices/resources 130. SNET data content 126 may comprise, for example, various user-driven (advertising) channels, pictures, videos, audio communications, links, online text, etc. Access to such content, as well as communications with and remote access to docked social devices/resources 130 of the SNET group 100, may occur over an Internet backbone 128, cellular communication system, WAN, LAN, etc.

A member of a SNET in accordance with various embodiments of the disclosure such as those disclosed herein may establish permissions and/or privacy settings that control and restrict who or what may access the member's profile(s) information, offer services, communication resources, connections and groups, as well as define desired degrees of access. Permissions may enable the user to maintain certain resources or information as private or available on a permissive basis only. For example, accessibility to available communication resources or social content may be limited to users/devices in a particular SNET or SNET group. Alternatively, such resources may be publicly available. Likewise, a SNET member may selectively decide to permit others to access personal information such as name, gender, contact information/email address, etc.

In the various embodiments, membership in a SNET group may be extended to encompass public and private social devices and equipment. For example, in a SNET group that includes human members, each human member may have a respective personal SNET sub-group of associated or docked social devices capable of independent or aggregated participation in the SNET group. The SNET sub-group may be locally or remotely accessible by a human member and/or other SNET group/sub-group members through various means, such as clicking on an icon or tag associated with the human member/personal sub-group. A SNET group may be persistent or of limited duration, and include ad hoc and/or static associations.

Exemplary social devices may be broadly categorized as either (i) social devices that include a user or SNET group interface sufficient to provide meaningful input to SNET interaction and (ii) social devices that support minimal or no user input relevant to SNET interaction. More particularly and without limitation, the first category may include computers, tablet devices, IPTVs, IPTV set top boxes, smart phones, servers, laptops, cloudbooks, network attached storage devices, gaming consoles, media players/sources, communication nodes (access points, routers, switches, gateways, etc.), user interface devices, power line communication (PLC) devices, etc. Such social devices may receive user input for SNET setup and management. The second category may include, again without limitation, printers, projectors, cameras and camcorders, scanners, speakers, headsets, smoke detectors, alarm systems, video cameras, mice, etc. In general, dockable social devices include any electronic device that could be operably coupled to or docked in a SNET group/sub-group via wired or wireless pathways to participate as a SNET member.

As will be appreciated, by docking social devices, members of a SNET group may gain full or partial remote control and interaction such devices via an authorized member SNET account. For example, family members authorized to participate in a "family" SNET group may remotely access docked social devices via one or more associated SNET accounts. Exemplary methods for docking and accessing social devices are described more fully below in conjunction with numerous of the Figures. Other capabilities according to various embodiments of the disclosure include numerous novel features and attributes as described more fully below and with general reference to FIG. 1.

Figure 2:
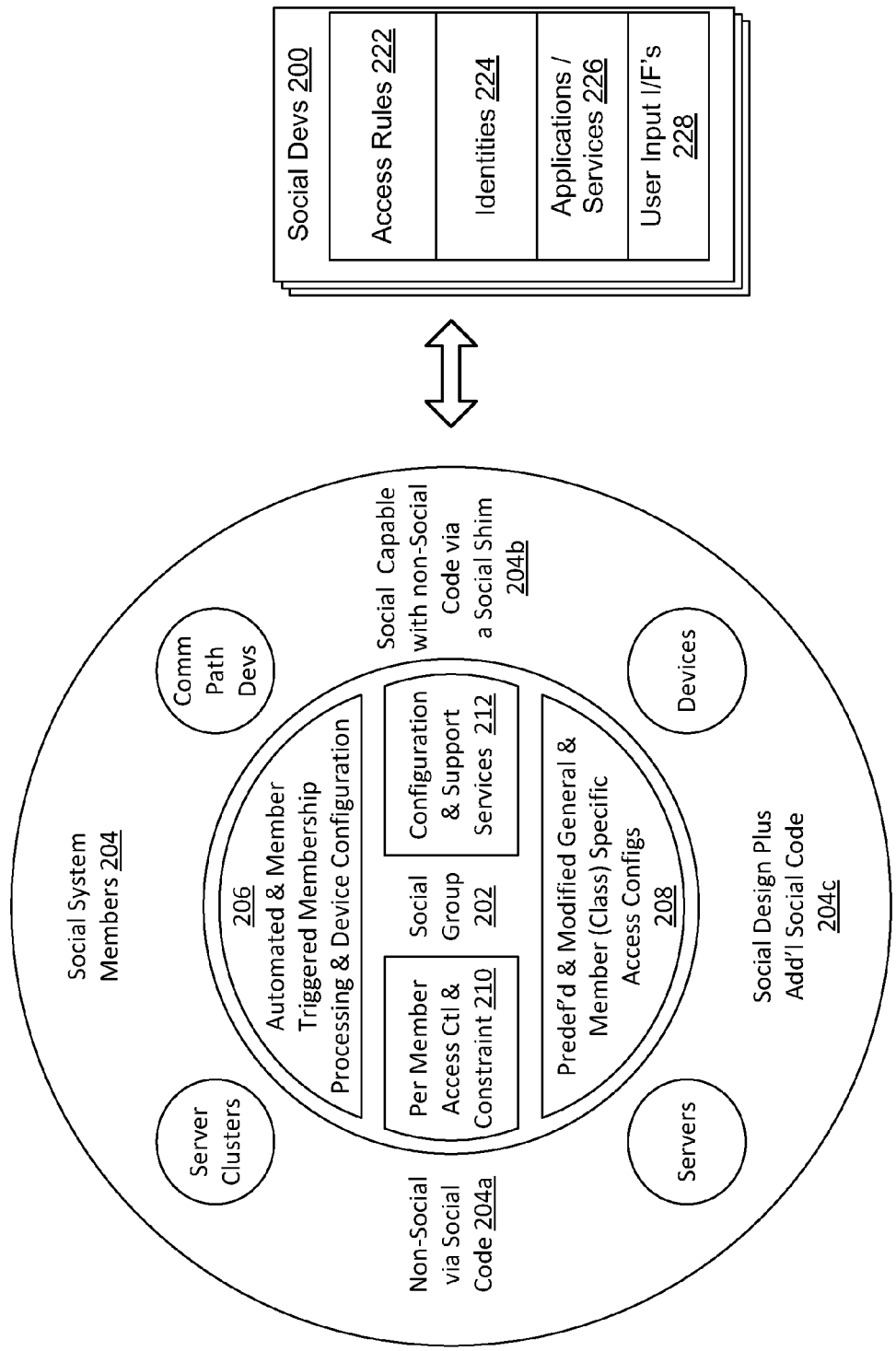
FIG. 2 illustrates a social group comprising a variety of members in accordance with an embodiment of the disclosure.

FIG. 2 illustrates an embodiment of a social group 202 comprising a variety of members in accordance with the present disclosure. In this embodiment, membership in the social group 202 may include a variety of social system members 204 functioning in various capacities within the social group 202. As will be understood, certain of the social system members 204 may support direct or indirect associations between the social group 202 and human members/non-members and social devices 200.

In the illustrated embodiment, social system members (or nodes) 204 include one or more local or remote servers and server clusters that provide a support infrastructure/supporting system for social group functionality and member operations (routing, data storage, services, dockable services, etc.). Communications within the social group and with non-members may occur via dedicated or multi-function communication path devices.

Social system members 204 further include devices configured to operate as nodes within the social group 202. Social functionality in such devices and other social system members 204 can be implemented through various means. For example, a device may have integral hardware/firmware/software to support social group access and member operations. Alternatively, a general purpose device 204a may include social code that enables participation in the social group 202. In a further embodiment, a device 204b designed to include social functionality may participate in the social group 202 through a combination of non-social code and a social shim layer or driver wrapper. In yet another embodiment, a member device 204c having a social design may utilize additional social code, including code specific to a social group 202.

Participation in the social group 202 is supported through functionality that includes automated and member-triggered membership invitations and processing (membership management) 206. More particularly, membership management 206 may function to invite prospective members to participate in the social group 202 through automatic, automated and member-triggered processes. For example, membership management 206 might be configured by a human user 200 to establish or modify a social group 202 by automatically inviting/accepting social system members having certain characteristics (such as new devices owned or controlled by the user or acquaintances of the user).

Processing of accepted invitations and unsolicited requests to join the social group 202 may be conditioned upon input or authorization from an existing social system member(s) 204 or social device 200 (e.g., through a user input interface 228). Similarly, membership management 206 may be configured to generate automated suggestions regarding which prospective members receive an invitation. Various other approaches, such as those described herein, can be used to establish membership in accordance with the disclosure.

Access to and visibility of resources of a social group 202, including services and data, may be managed through general and member class-specific access configurations 208. For example, if membership in the social group 202 includes family members and associated devices, a uniform access configuration (or separate device and human configurations) could be applied across the class in an automatic or automated manner. In other embodiments, access control and constraints 210 are imposed on a per-member basis. In the illustrated embodiment, social devices 200 include one or more of access rules 222, device or user identification information 224, applications and services 226, and user input interfaces 228.

The social group 202 may offer a wide variety of configuration and support services 212, including both internal and external services accessible by social system members 204. By way of example and in addition to the support services described elsewhere, the social group 202 may offer payment processing services, storage and backup services, robotic control functions, digital assistants, and other services (certain of which may themselves participate as members) between full members and/or authorized guest members and visitors. In certain embodiments, configuration and support services 212 may themselves participate or be selectable to participate as members of the social group 202. As with other resources of the social group 202, access control and constraints on configuration and support services 212 may be applied to individual members or classes of members.

Figure 3:
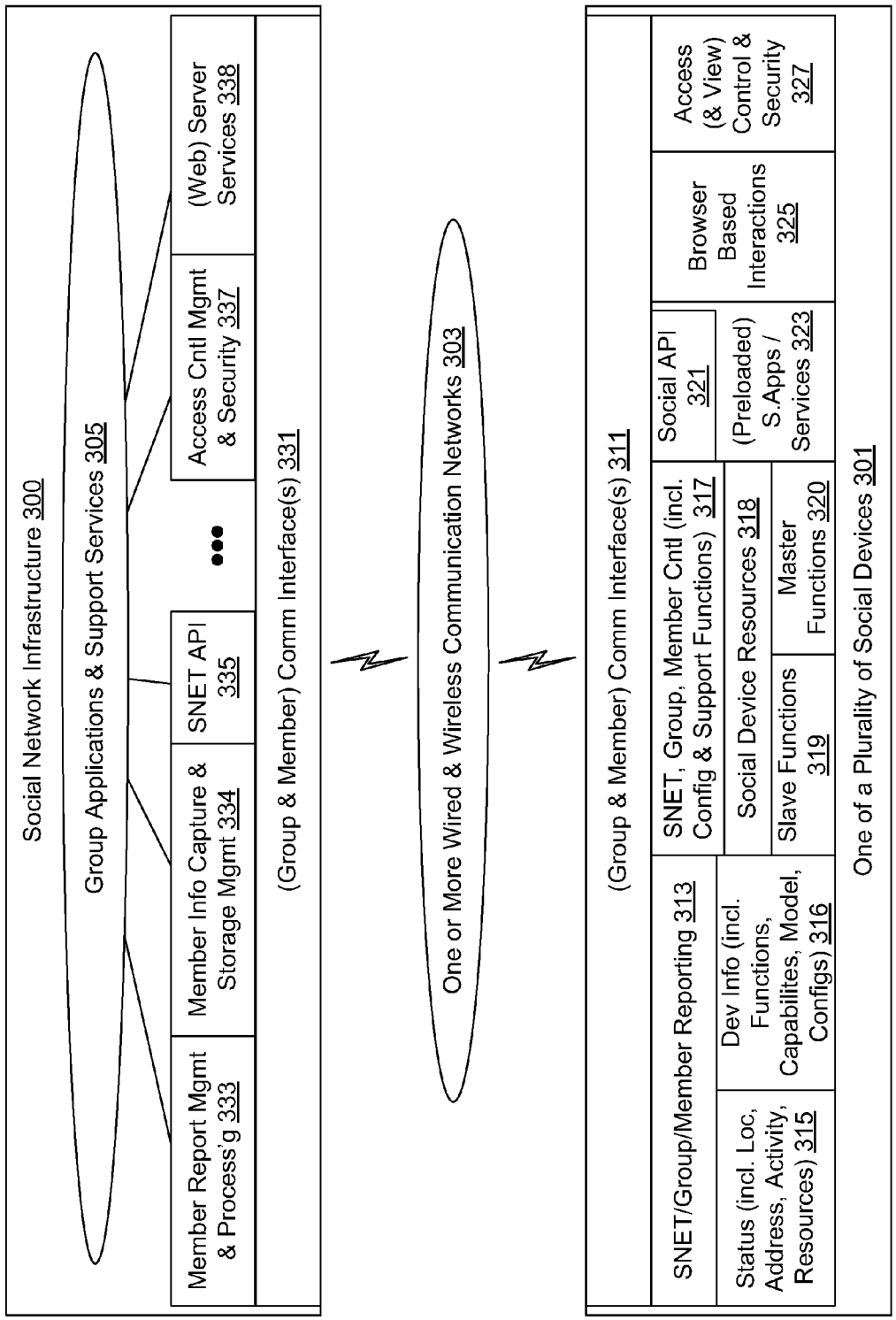
FIG. 3 is a functional block diagram illustrating a social network infrastructure and social resources/devices in accordance with an embodiment of the disclosure.

FIG. 3 is a functional block diagram illustrating a social network (SNET) infrastructure 300 and (member) social device(s) 301 in accordance with an embodiment of the disclosure. Communications between the social network infrastructure 300 social device(s) 301 and other SNET members may occur over one or more wired and wireless communication networks 303. The SNET infrastructure 300 and social device(s) 301 are coupled to the communication networks 303 by communication interface(s) 331 and 311, respectively, either of which may support communications with individual SNET members or groups/classes of SNET members.

The SNET infrastructure 300 of the illustrated embodiment includes a number of functions and resources to support formation and maintenance of a SNET having social device (and/or service) members. In particular, member report management and processing 333 receives information from SNET/group/member reporting functions 313 in associated social devices 301. Such information may include, for example, status data 315 regarding technology usage, location, address and activities of a social device 301 and/or device user.

In addition, the social device 301 may provide device information 316 indicating, for example, device functions and social capabilities as well as configuration and servicing needs relating thereto, device model number(s), device configurations, software versions, attached peripherals and downstream (social) devices, device resources and usage, etc. Such information may be preloaded in a device and modified on a dynamic basis. Device information 316 relating to available resources/services and current resource usage may be utilized by the SNET infrastructure 300 for purposes of SNET resource configuration and management.

In various embodiments, the social device 301 may have an obligation to gather, store and/or report device status or usage information 315/316 at different times. For example, reporting may be required upon affiliation or docking with a SNET, on a (predetermined or configurable) periodic basis, and/or during operational engagements with other intra- and inter-SNET resources and devices, including upstream and downstream devices.

Referring again to the SNET infrastructure 300, additional functionality and resources include, without limitation: SNET member information capture and storage management 334; a SNET application programming interface (API) 335 that allows SNET associated software components to communicate with each other; security and access control management 337 for maintaining the integrity of the SNET and affiliated data/resources; and (Web) server services 338. The social network infrastructure 300 further comprises other group applications and services 305 corresponding to the foregoing, as well as additional services such as those described herein. In one exemplary embodiment, the SNET infrastructure 300 might determine (e.g., by means of device information 316) the category and nature of a social device 301 wishing to participate in a SNET. As necessary, functionality in the SNET infrastructure 300 could then direct or trigger installation of appropriate application software and underlying drivers in the social device 301. Such operations might be performed with minimal involvement from inherent functions of the social device 301.

In the illustrated embodiment, the social device 301 comprises a number of additional functions and resources to support participation in a social network. More particularly, SNET, group and member control functions 317 (including device configuration and support functions) may include slave functions 318, master functions 319, and various combinations thereof. Slave functions 318 include, for example, device (re-)configuration, directed resource allocation, managed resource arbitration, bridging operations, etc. Master functions 319 enable the social device 301 to establish, manage, and terminate various interactions between nodes or groups of nodes in a social network, including interactions involving the social device 301 itself.

The social device 301 further includes a social API 321 and browser-based interaction capabilities 327 to support, for example, relevant (installed or preloaded) social applications and services 323, which might comprise slave and master functions 318 and 319. Security and access control 325 layers permit the social device 301 to interface with or establish secure SNET groups/circles and control access to internal and external SNET resources.

It is noted that numerous of the functional building blocks of the embodiment of the disclosure illustrated by FIG. 3 may be incorporated, in whole or part, in one or more (application specific) integrated circuit devices. For example, an integrated circuit device may include a member reporting module to provide member reporting functionality (including communication of device status and device characteristics), device control capabilities, master/slave functions, security and access control modules, etc. Such an integrated circuit device may also include onboard processing capabilities and/or interface with a processor device. Alternatively, several of the functions described above may be incorporated, in whole or part, into an operating system and/or software loaded above an operating system kernel.

Figure 4:
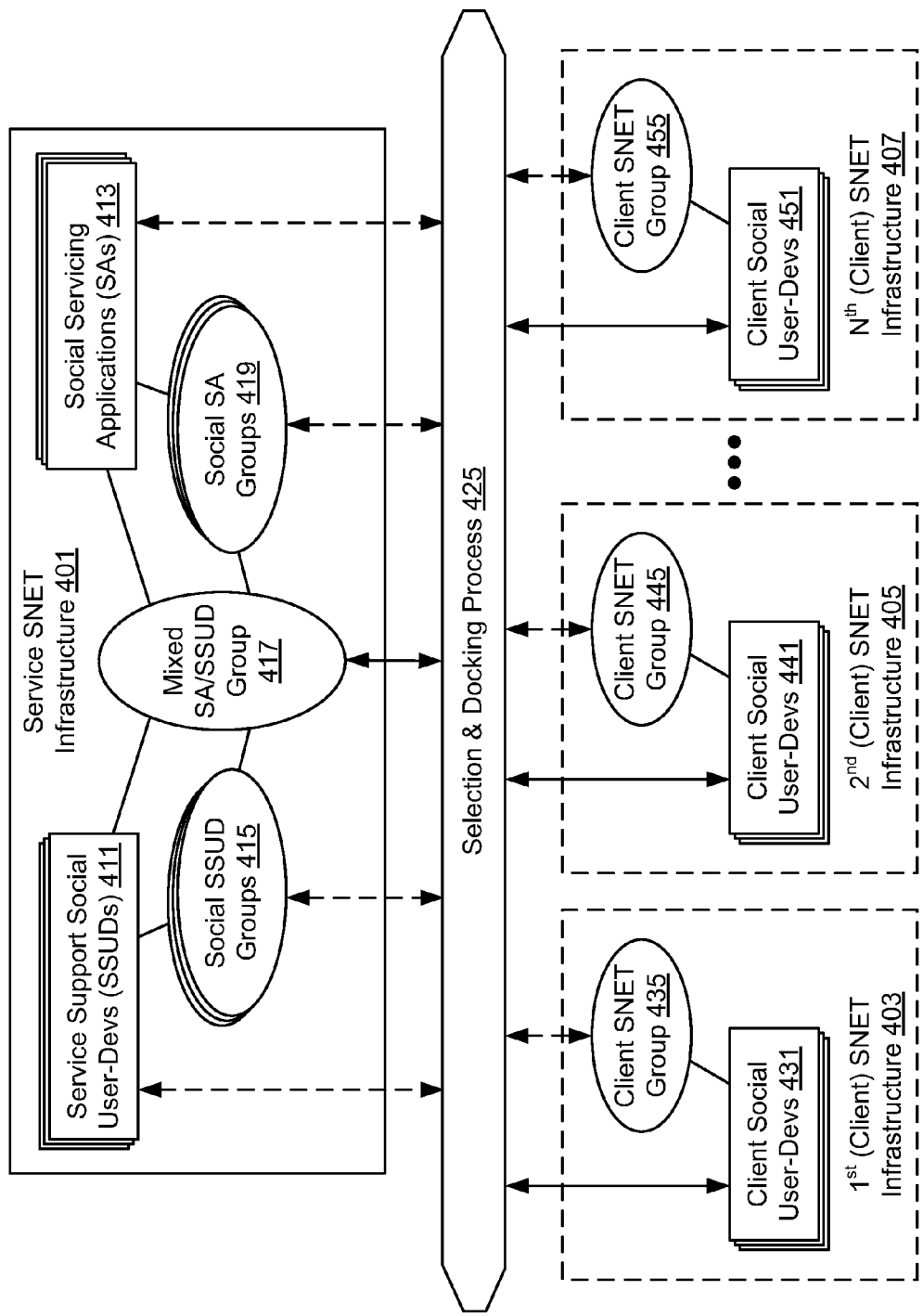
FIG. 4 is a schematic block diagram of a social networking grouping hierarchy according to various embodiments of the disclosure.

FIG. 4 illustrates a schematic block diagram of a social networking grouping hierarchy 400 according to various embodiments of the disclosure. In some embodiments, a SNET grouping hierarchy 400 includes one or more tiers of SNET infrastructure, encompassed at least in part by a SNET, that can be docked to (hereinafter referred to interchangeably as "associated with", "joined to", and the like) other SNET infrastructure, SNET groups, and social devices. For example, in the illustrated embodiment, one tier of SNET grouping hierarchy 400 can include a service SNET infrastructure 401, and another tier of SNET grouping hierarchy 400 can include one or more client SNET infrastructures 403, 405, and 407. In some embodiments, various tiers can be docked such that a "higher" tier can be docked to "lower" tiers to provide access by "lower" tiers to various capabilities provided by the "higher" tier.

In some embodiments, one or more infrastructures are managed by one or more processing systems, computers, server devices, network nodes, social devices/services, or some combination thereof. For example, in the illustrated embodiment, some or all of the service SNET infrastructure 401, one or more client SNET infrastructures 403, 405, and 407, or some combination thereof may be managed by one or more social service support devices 411, one or more client social devices 431, 441, and 451, or some combination thereof. Processing systems can include, without limitation, one or more instances of processing circuitry distributed across one or more server devices or network nodes.

For example, in the illustrated embodiment, SNET grouping hierarchy 400 includes a service SNET infrastructure 401 in a first tier, and multiple client SNET infrastructures 403, 405, and 407 in a second tier. Infrastructures can include, without limitation, one or more SNET groups, one or more support services, applications, resources, devices, and the like associated with one or more entities, which can include, without limitation, clients, members of a SNET, nonmembers of a SNET, guests of a SNET, manufacturer groups, service groups, etc. For example, service SNET infrastructure 401 may include user devices 411, applications 413, and SNET groups 415, 417, and 419 associated with one or more support services.

Similarly, a client SNET infrastructure 403 can include one or more client SNET groups 435 and one or more social devices 431 associated with one or more particular clients (hereinafter referred to interchangeably as users, members, visitors, guests, and the like). For example, a first client-side infrastructure 403 can include one or more SNET groups 435 associated with a SNET member, along with one or more social devices 431 associated with the SNET member. As shown in the illustrated embodiment, the social devices 431 in a client infrastructure 403 can be docked or otherwise affiliated with SNET groups associated with the client. In some embodiments, a device or SNET group docked to another SNET group becomes a member of the SNET group to which it is docked. By docking a client social device 431 to a client SNET group 435, a user associated with a client SNET group 435 may interact with the SNET group 435 by interacting with a social device 431 docked to the SNET group 435. Members, clients, users, and the like may include, without limitation, human members of a SNET or some other network, device members of a SNET or some other network, certain fixed and intelligent services, some combination thereof, etc.

In some embodiments, one or more capabilities which might include, for example, various support services, applications, or SNET groups, are mixed, combined, and/or merged via a docking process, into one or more SNET groups that can provide access to a desired selection of capabilities through interaction with the one or more SNET groups. For example, service SNET infrastructure 401 illustrates capabilities that can be provided by various service support social user devices 411 and/or various social servicing applications 413. In some embodiments, access to various service support social user devices 411, either directly or through interaction with a SNET group 415 to which the service support social user devices 411 are docked, and access to various social servicing applications 413, either directly or through interaction with a SNET group 419 docked to the social servicing applications 413, can be provided to SNET members.

One or more of the capabilities provided by the devices 411, applications 413, and SNET groups 415 and 419 may be combined into a single SNET group that can provide access to one or more capabilities provided by devices, services, applications, SNET groups, or some combination thereof. For example, a user of a client SNET infrastructure 403 can, by docking a social device 431, via a docking process 425 (which may be supported by local or distributed system circuitry), to a single SNET group 417 that itself combines SNET groups 415 and 419, gain access to the capabilities provided by both SNET groups 415 and 419 by docking with SNET group 417.

In some embodiments, access to support services and other capabilities provided by one or more SNET groups/infrastructures can be accomplished by docking one SNET group to another SNET group. For example, a client SNET group 435 can be docked, via a docking process 425, to SNET group 417, thereby enabling a user of the client-side infrastructure 403 to access the capabilities provided by SNET group 417 through the client SNET group 435. In particular, where one or more social devices 431 are docked to the client SNET group 435, a user can access the capabilities provided by SNET group 417 via one or more of the social devices 431 that are docked with the client SNET group 435.

In some embodiments, docking SNET groups such that a user, member, client, or the like can access capabilities provided by various services, devices, and SNET groups associated with various SNET infrastructures enhances security. For example, where a user associated with a first client SNET infrastructure 403 can only access capabilities provided by service SNET infrastructure 401 by docking with SNET group 417, various levels of security can be utilized by one or more processing systems/devices associated with the service SNET infrastructure 401, client SNET infrastructure 403, etc. to ensure secure access to the capabilities.

In addition, in some embodiments, accessing capabilities provided by a SNET infrastructure by docking two or more SNET groups provides additional levels of security. For example, where access to capabilities provided by service SNET infrastructure 401 entails docking a client SNET group 435, 445, 455, or the like to SNET group 417, a more secure connection, with various levels of security, can be employed, and access to the capabilities can be easily granted, altered, restricted, or terminated via management of a single dock or association between a client SNET group and SNET group 417. A processing system/device associated with the service SNET infrastructure 401 or a client SNET infrastructure 403 may manage the association based upon inputs received from a user, a third-party entity, some internal logic, elapse of a period of time, a change in geographic location of a client social device 431 associated with the client SNET infrastructure 403, or some other trigger event.

In some embodiments, the selection and docking process 425 can be automated, and/or automatic. For example, a docking process may be automatic by being triggered based upon a location of a user of an infrastructure, including, without limitation, a geographic proximity of one or more of a user, a social device 431 associated with a user, or a social device 431 docked with a particular client SNET group 435. In some embodiments, a user can provide one or more association rules that can provide conditions under which one or more particular client SNET groups 435 can be docked to other SNET groups. Conditions may include, for example, geographic proximity of one or more social devices 431 docked to the particular client social 435 to a geographic location associated with a SNET group 417, authorization by a user associated with the infrastructure 403, SNET group 435, or social device 431 to dock the client SNET group 435 with SNET group 417. Association rules can be communicated to a social device 431 docked with a particular SNET group 435 or a processing system that manages docking of various SNET groups. A processing system, a social device 431, or some combination thereof can monitor a client SNET group 435, social device 431 docked to the client SNET group 435, one or more attributes of another one or more SNET groups 417 in relation to one or more attributes of one or more client SNET groups 435, docked social devices 431, or the like in relation to one or more association rules in order to determine whether to dock one or more SNET groups and/or social devices/services together. Association rules can be altered by a user or a processing system on the fly to create new rules, delete rules, alter rules, etc. For example, a user associated with a client SNET group 435, who may have previously communicated to a processing system an association rule that prohibits docking the client SNET group 435 to a SNET group 417 beyond a threshold geographic proximity to a social device 431, can communicate, on the fly, an alteration of the association rule that can include, for example, altering the threshold geographic proximity, authorizing a docking of the client SNET group 435 to a particular SNET group 417 on a case-by-case basis, ordering an undocking of a client SNET group 435 from another SNET group, etc.

In some embodiments, various tiers of a SNET grouping hierarchy 400 are subject to various levels of access to information and/or services. For example, in the illustrated embodiment, a user of the "higher-tier" service SNET infrastructure 401 may be able to access or view each client SNET group 435, 445, and 455 associated with a "lower-tier" client SNET infrastructure 403, 405, and 407 that is docked to a SNET group 417 associated with the social service infrastructure 401. A user of the service SNET infrastructure 401 may also be able to view the various social devices 431, 441, and 451 docked to the various client SNET groups 435, 445, and 455. In another example, one or more users of a "lower-tier" infrastructure including, without limitation, client SNET infrastructure 403, 405, and 407 may be able to view some or all of the capabilities provided through a SNET group associated with a "higher-tier" infrastructure to which a SNET group associated with the "lower-tier" infrastructure is docked, but cannot view some or all of the "higher-tier" infrastructure, including, without limitation, various SNET groups 415 and 419 from which capabilities provided by SNET group 417 are originally provided. Additionally, a user of a "lower-tier" infrastructure accessing a SNET group 417 associated with a "higher-tier" service SNET infrastructure 401 may be unable to view some or all of the other similarly "lower-tier" client SNET infrastructures 405 and 407 that are also docked with the same SNET group 417.

In some embodiments, the selection and docking process (or service) 425 can be controlled or managed by one or more various social devices or processing systems. For example, a processing system of a SNET infrastructure, which can include one or more instances of processing circuitry distributed across one or more server devices and/or network nodes may control the docking and undocking of one SNET group to another, based upon a user's interaction with the SNET, one or more association rules, one or more inputs, some internal logic, etc. As another example, a social device may control the docking and undocking of one or more SNET groups based upon a user's interaction with the SNET, one or more association rules, one or more inputs, some internal logic, etc. In some embodiments, a processing system or social device authorized to manage a "higher tier" infrastructure can manage one or more attributes of access by one or more "lower-tier" infrastructures docked to the "higher-tier" infrastructure. For example, a processing system authorized to control a "higher-tier" social service infrastructure 401 may alter access to certain capabilities, restrict access to certain capabilities, and/or terminate access via undocking of SNET groups and devices based upon input or other logic operation. The processing system may determine that a trigger event (e.g., all social devices 431 docked with a client SNET group 435 docked to SNET group 417 have exceeded a predetermined threshold of proximity distance from a geographic location associated with SNET group 417) has occurred and, based upon the determination, undock the client SNET group 435 from SNET group 417, partially or fully restrict access by client SNET group 435 to certain capabilities provided by SNET group 417, etc.

Figure 5:
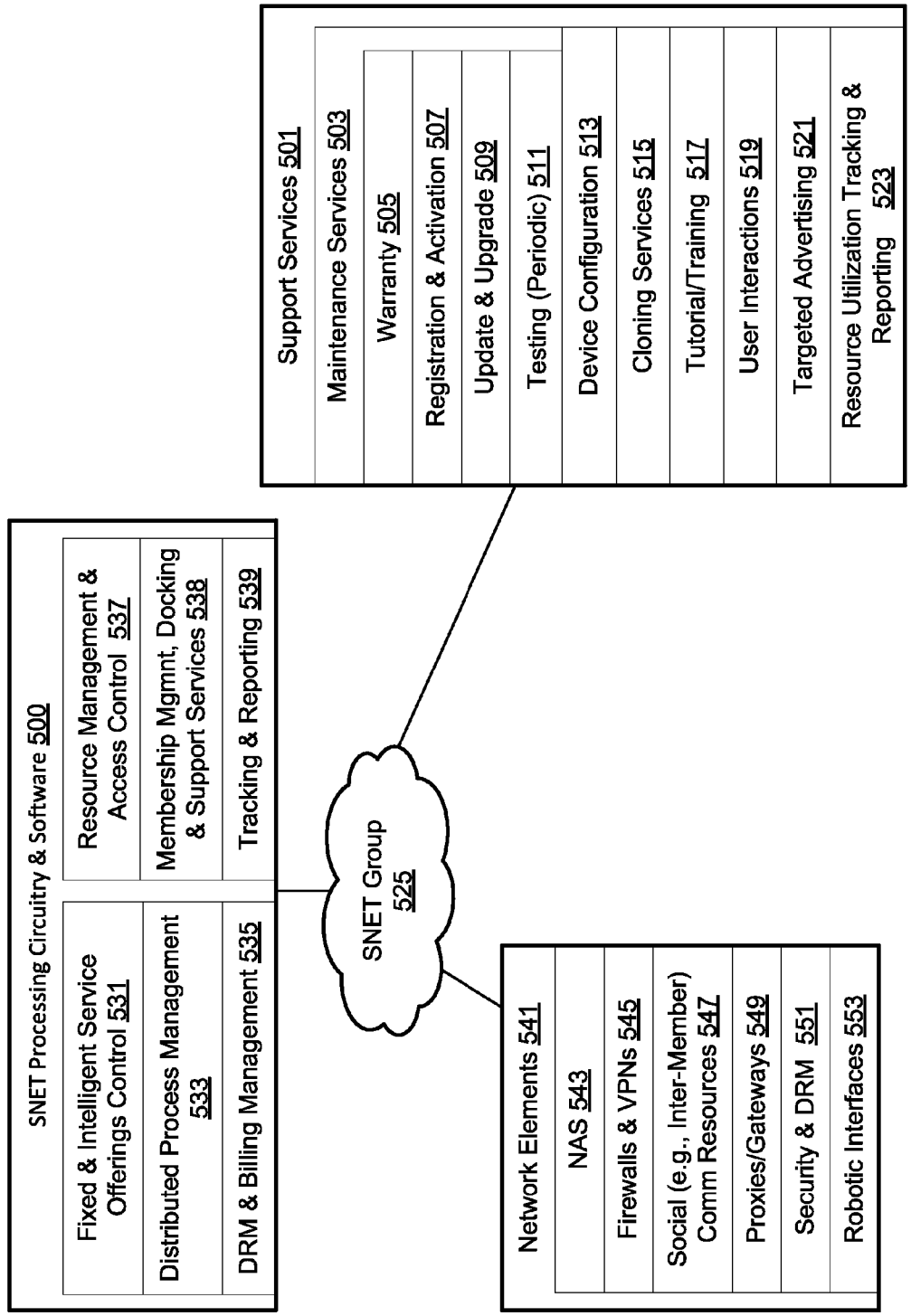
FIG. 5 is a functional block diagram of various embodiments of a social network group offering support services and network elements in accordance with the disclosure.

FIG. 5 is a functional block diagram of various embodiments of a social network group 525 offering support services 501 and network elements in accordance with the disclosure. In the illustrated embodiments, standalone or distributed system circuitry such as SNET processing circuitry and software 500 manages formation, maintenance and operation of SNET group 525, as well as provision and management of affiliated service and resource offerings. It is noted that the "SNET processing circuitry" may comprise local and/or remote hardware, software, applications, or various combinations thereof, and be configurable to support various support services/resources such as disclosed herein. Further, the SNET processing circuitry and software 500 may be included in one or more processing systems, SNET infrastructures, computers, (distributed) server devices, network nodes, cloud-based resources, social devices/services, or some combination thereof. Likewise, SNET group 525 may be comprised of one or more SNET groups/sub-groups.

SNET group 525 members, clients, users, and the like may include, for example, human members of a SNET or some other network, authorized nonmembers of a SNET, guests of a SNET, device members of a SNET or some other network, certain support services/resources, some combination thereof, etc. In various embodiments, one or more services and capabilities associated with SNET group 525 may be accessed directly or through interaction with the SNET group 525 (e.g., via supporting system and/or a tiered SNET grouping hierarchy such as described in conjunction with FIG. 4). In addition, SNET group 525 may offer a series of services and/or resources that become available upon docking of a particular supporting device. Such services may be visible and available across a user(s) SNET account, to a particular SNET group/circle, to the functional member itself, to all SNET membership, etc.

In various of the illustrated embodiments, for example, a variety of services and resources are supported in a SNET group 525, including support services 501 and computing and networking elements 541. The SNET processing circuitry and software 500 of the illustrated embodiments include one or more hardware/software functions for managing and facilitating such services and resources. These functions may include, for example, fixed and intelligent service offering control capabilities 531 (which may include configurable resource offering views, including visual offerings), distributed process management functions 533, DRM and billing management capabilities 535, resource management and access control capabilities 537, membership management, docking and support services 538, and tracking and reporting functions 539.

A SNET group 525 according to the illustrated embodiments may support and offer a wide variety of support services 501. By way of example, and without limitation, maintenance services 503 may be offered, including warranty services 505, registration and activation services 507, updating and upgrading services 509, and (periodic) testing services 511. Other service offerings may include device configuration services 513, cloning services 515, tutorial and training services 517, user interaction support 519, and targeted advertising services 521.

The support services 501 further include resource utilization, tracking and reporting services 523. Frequently, and especially in conjunction with multi-function and feature-rich devices, a manufacturer or service provider subject to utilization-based technology licensing or royalty obligations may find it difficult to track device usage. For example, a given device may incorporate multiple and alternative audio/video codecs or other configurable features, the use of which triggers royalty reporting obligations to a technology licensor. Similarly, marketing and social media content providers frequently charge consumers or advertisers on a consumption or subscription basis, or may desire usage information relevant to ratings and advertising revenue. Unfortunately, the information necessary to meet such licensing obligations and needs may be very difficult to collect once a device is in service and no longer accessible by the licensee.

In order to address difficulties related to technology/media usage tracking, a SNET (e.g., through resource utilization, tracking and reporting services 523) and social devices such as those described above may be configurable to detect, monitor and/or report the usage of certain technology/media for purposes of establishing an independent basis for royalty assessment.

According to another embodiment of the disclosure, an application docked as a SNET group 525 member may be configured automatically as a DMZ member with underlying functionality, such as a guest member having access to some SNET group resources but not others. For example, in an embodiment involving gaming activities, joinder of a SNET group by a gaming application and game member might result in service offerings to other SNET group members including, without limitation, configuration services based at least in part on underlying device limitations/capabilities. Similarly, docking of members may also trigger antivirus and malware detection services within the SNET group 525, spanning all (or a subset) of implicated social devices, services, and software.

Network elements 541 may include, by way of example and without limitation, network attached storage (NAS) 543, firewalls and VPNs 545, social or allocable communication resources 547, networking/communication proxies and gateways 549, security and DRM hardware/firmware 551, robotic interfaces 553, databases, etc. Such resources may be allocated and utilized for specific purposes, or in support of one or more services and distributed processes such as those described herein. Various approaches may be utilized for managing and allocating network elements 541 as well as services and other resources.

As will be appreciated, a SNET group 525 may be configurable to perform and utilize a wide variety of functions and services, including both member and non-member services, and selection of such services for use by a particular SNET group 525 may occur in a variety of ways. By way of example, a member device may offer a menu of available services to an affiliated human for use in selecting (local or remote) services for docking as a group member or otherwise activating and/or configuring services. Alternatively, services themselves, including member services or cloud-based services, might generate an invitation that can be accepted by one or more SNET group 525 members or affiliates. In other embodiments, a device that incorporates a social service (e.g., a social device purchased by a human member of a SNET group) can be activated and docked as a member of a SNET group, thereby making the social service available to other group members and affiliates. Alternatively, a service incorporated in a device—rather than the full device—may be docked with a SNET group. Further, a social service in accordance with the disclosure may have multiple portions that run on different nodes of a SNET group or SNET support infrastructure. Using a configuration service as an example, a portion of such service may operate on a docked social device, while other portions of the service may run on other SNET group nodes.

Figure 6:
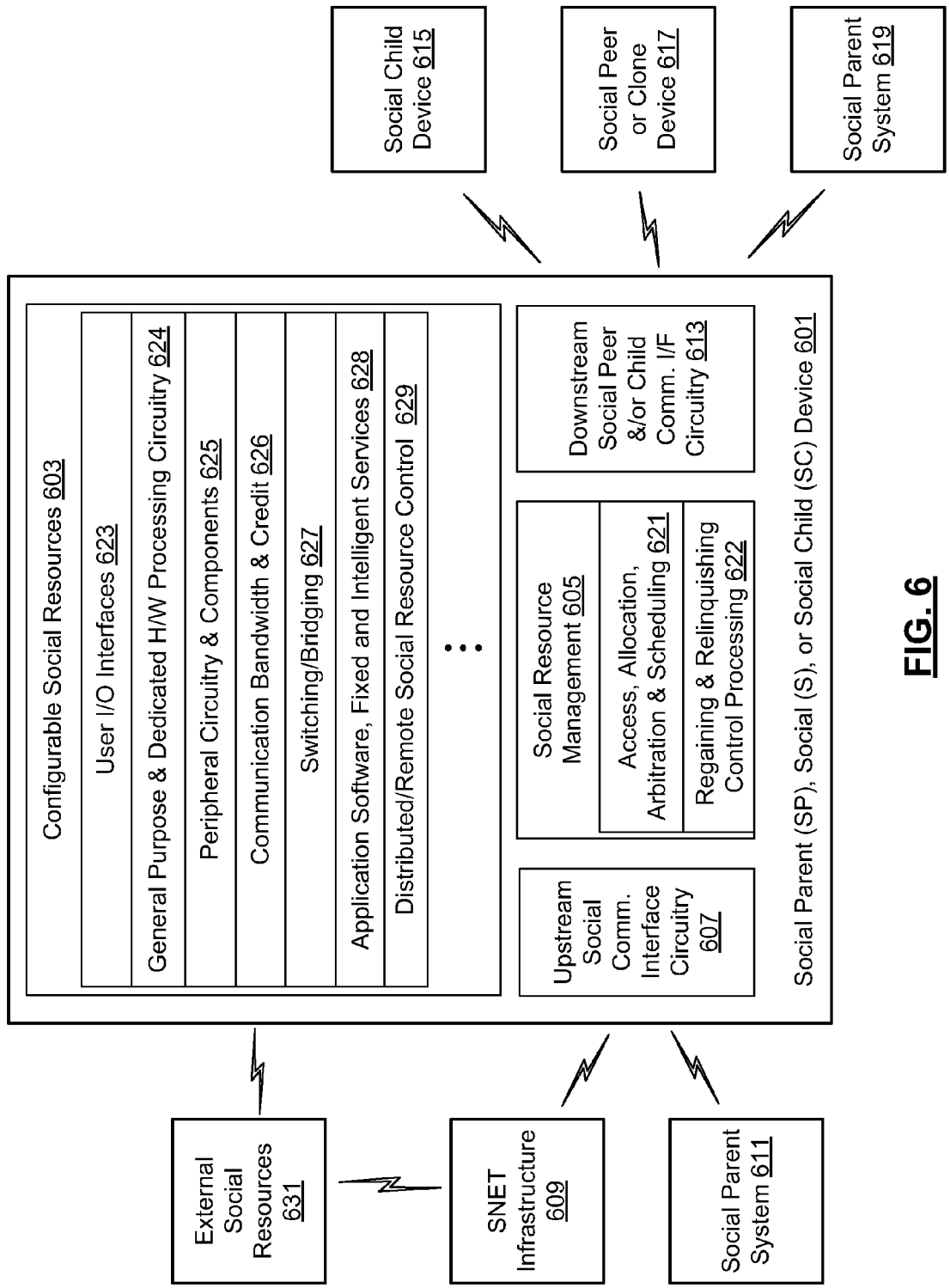
FIG. 6 is a schematic block diagram of a social device operable to support various interactions between other social devices and social services and systems in accordance with an embodiment of the disclosure.

Referring now to FIG. 6, a schematic block diagram is shown for a social device 601 operable to support various interactions between other social devices and social services and systems in accordance with an embodiment of the disclosure. The social device 601 is configured with a variety of functions that enable it to operate in a social device hierarchy comprising social (S) devices, social "parent" (SP) devices and social "child" (SC) devices. For example, a social parent device may enable a docked social child device to access resources of the parent device and/or connect to and interact with (directly or indirectly) with a social network. The social child device may be configured with inherent social capabilities, or gain access to such capabilities from or through an associated parent device. Further, a human SNET member might have associated social child devices, or be served by a social parent device via a user I/O interface (623).

A social device 601 according to various embodiments and applications of the disclosure may also concurrently or selectively function as a social device, SP device, SC device, or even a "grandparent" device that supports (e.g., in a multi-hop environment) a parent device in a SNET group. Dynamic and static hierarchical associations between SP and SC devices may be established in a selective, automatic or automated manner. Further, a social device 601 may take many forms including, without limitation, a smartphone, personal computer, server, tablet device, access point, gateway, network switch/hub, bridging device, set top box, or other device enabled with social capabilities.

In the illustrated embodiment, the social device 601 is communicatively coupled to a SNET infrastructure 609 and/or social parent system 611 via upstream social communication interface circuitry 607. Likewise, downstream social peer and/or child communication interface circuitry 613 enables coupling with a social child device 615, social peer or clone device 617 and/or social parent system (device) 619. Social resources of both upstream and downstream devices may be accessible to one another via the social device 601.

The social device 601 of this embodiment includes configurable social resources 603 that, along with external SNET resources 631, are managed by a social resource management module 605 and accessible to at least one other SNET group member. Specific configurable social resources 603 may include user I/O interfaces 623, general purpose and dedicated hardware processing circuitry 624, peripheral circuitry and components 625 (which may or may not have social capabilities), communication bandwidth and credit determination functionality 626 (e.g., for use by payment processing services), switching/bridging functions 627, application software and fixed/intelligent services 628 (e.g., support services), distributed/remote social resource control 629, etc. The external social resources 631 may comprise, for example, an external data/digital library, or content from one or more of cable, satellite and/or terrestrial televisions systems.

Among other functions, the social resource management module 605 comprises access, allocation, arbitration and scheduling functionality 621, as well as the functionality for establishing, regaining and relinquishing control processing operations 622, including operations involving access to configurable social resources 603. It is noted that counterpart social resource management functionality may be present in the SNET infrastructure 609 and/or other SNET nodes.

In one exemplary embodiment wherein the social device 601 comprises a switching bridge, bandwidth capacity may be dynamically allocated by access, allocation, arbitration, and scheduling functionality 621. Access to bandwidth capacity and other resources of the social device 601 might be available only upon request, per access views, or per allocation and arbitration functions, and selectively terminated when excessive bandwidth/resources are consumed or requested.

Figure 7:
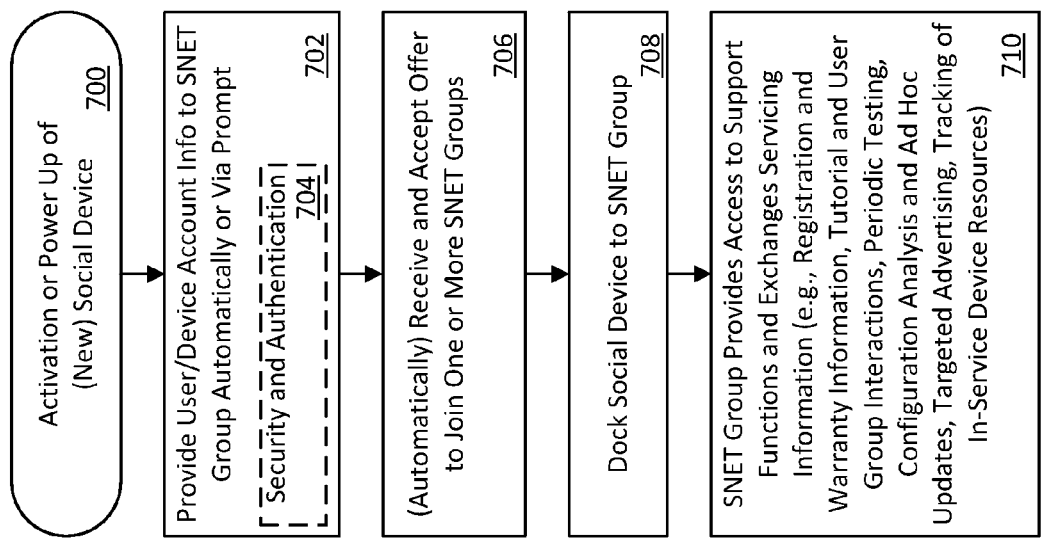
FIG. 7 is a logic diagram of a method for servicing and supporting a social device through an automatic or manual SNET group association processes in accordance with an embodiment of the disclosure.

FIG. 7 is a logic diagram of a method for servicing and supporting a social device through an automatic or manual SNET group association processes in accordance with an embodiment of the disclosure. In this embodiment, the method commences in step 700 following activation or power-up of the social device. The social device may be a new device in need of configuration or like services, or an existing device requiring maintenance or other support services.

Next, in step 702, user and/or device account information is provided to a SNET or SNET group, either automatically or via a manual process that may involve, for example, a set-up prompt. Communication of the account information may indicate a desire to associate, dock, or access support services and other group resources of a SNET group. In addition, security and authentication procedures 704 may be performed in conjunction with this or any of the steps of the illustrated method. These operations may involve multiple steps, including manual/human confirmation requirements.

In step 706, the social device next receives and accepts an offer to join one or more SNET groups. As noted, this may be accomplished via an automated process or partially automated process. In one exemplary embodiment, a device may approach within a threshold, such as a proximity threshold, of an access point for a premises, upon which the access point or some other device associated with the premises delivers an invitation to the device, or a human user via the device, to dock to a SNET group associated with the premises. The invitation can vary depending upon whether one or both the device or human user is already a member of the SNET. Where the device is not a social device, the access point can deliver an invitation in the form of a web page to the device, via a browser application or the like, that offers the device or device user the option of joining a SNET group as an ad hoc member. Where the device is a social device, the invitation can include a direct invitation to dock a SNET group with the premises-associated SNET group via a social interface or user interface located within the device.

The invitation can be accepted via one of various acceptance processes. For example, where a social device receives an invitation that includes a unique identifier indicating the SNET group to which the member is invited to dock, the social device can interact with an access point, another device, a SNET, SNET group, SNET sub-group, and the like via an independent pathway to accept the invitation. Acceptance in the above example may include simply delivering the unique identifier and information identifying the device or SNET group associated with delivery of the unique identifier, following which the SNET group is docked to the premises-associated SNET group. In addition, where a non-social device attempts to access an access point, and the access point pushes a web page to a browser application on the non-social device, the acceptance process can include accessing the web page, indicating a desire to dock with the SNET group (and perhaps providing other information). In response, the non-social device or an affiliated ad hoc guest SNET group is accepted and docked to the premises-associated SNET group, and can gain access to support services and servicing information provided by a premises-associated SNET group.

In some embodiments, upon crossing another (or the same) threshold, docking to the SNET group can be terminated or restricted. For example, where a device entering a premises is offered and accepts an ad hoc docking to a SNET group by an access point, the access point may restrict or terminate the ad hoc docking upon determining that the device has left the premises.

Next, in step 708, the social device is docked (e.g., online, through near-field communications (NFC) and/or Bluetooth coupling, or via networked operations) to a SNET group. In certain embodiments, such docking and membership offer processing is initiated or managed by a docking service supported by one or more nodes (e.g., a server system) of social networking system and/or a relevant SNET group.

In some embodiments, a docking link between various SNET groups and social devices/services is managed based on various docking specifications. A docking specification can, in some embodiments, manage one or more particular docking links and specify, for example and not by way of limitation: access limitations, restrictions, and grants associated with various capabilities of a SNET group; security access requirements; periods of access; and trigger events upon which access is to be altered, restricted, granted, and/or terminated. In some embodiments, default docking specifications can apply a default treatment for access, offerings, interactions, etc. with regard to one or more particular SNET groups, but permit specific offering/access modifications where needed by authorized SNET nodes and/or groups. Likewise, overall default treatment can be modified.

Following the docking process, in step 710 the SNET group provides access to support functions and/or exchanges servicing information such as registration and warranty information based on identity data associated with the social device; tutorial and user group interactions; periodic testing, configuration analysis and ad hoc or periodic updates/upgrades; targeted advertising; tracking of in-service device resources; etc. As described more fully below, the support service may also perform cloning operations, such as extending device configuration data of a first device associated with the SNET group for use in configuring another device, such as a device that is docked in accordance with the preceding steps. Support services can be docked to the SNET group, and may run on a server system that supports the SNET group, or on one or more nodes of the SNET group. By way of example, upon activation or connection to a network, a new device may be pre-programmed to contact and join a manufacturer group, a retailer group, a user group, an independent warranty group, or some other like SNET group for purposes of registering or configuring the device. As will be appreciated, an entity such as a manufacturer may also participate as a member of one or more such groups.

Figure 8:
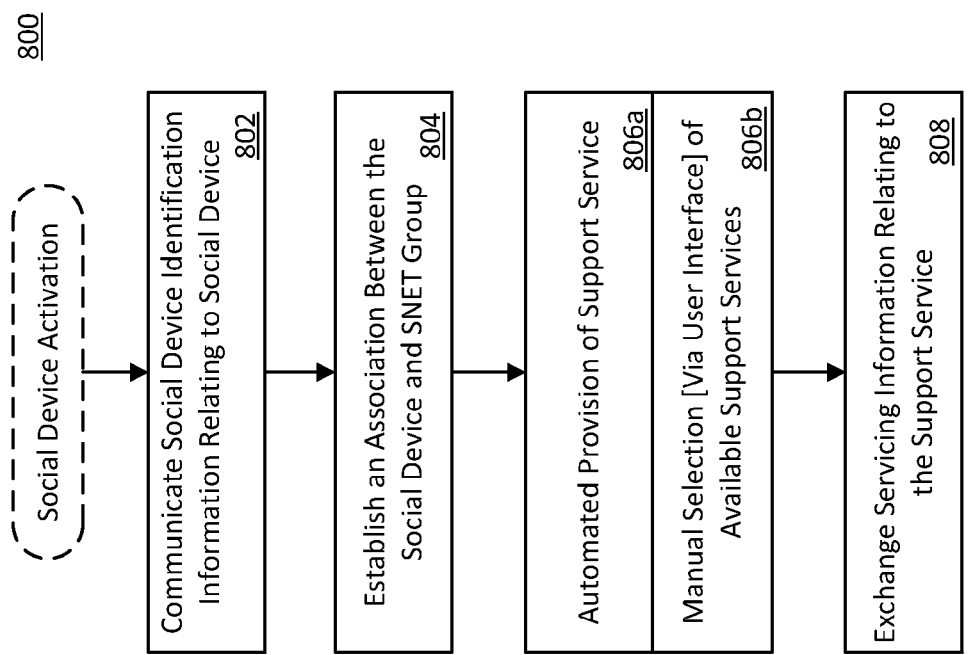
FIG. 8 is a logic diagram of a method for providing support services to a social device in accordance with various embodiments of the present disclosure.

FIG. 8 is a logic diagram of a method 800 for providing support services to a social device in accordance with various embodiments of the present disclosure. Following activation of the social device, identification information associated with the device is automatically communicated to a SNET or SNET group as shown in step 802. Next, or contemporaneously, in step 804 an association (e.g., docking as a member) is established between the social device a SNET group.

Subsequent provision of support services and interactions may occur in automated manner as shown in step 806a. Alternatively, one or more available support service operations may be manually selected as shown in step 806b, such as selection through interaction with a menu of services provided by a user interface. The menu of available support service operations may be determined, at least in part, based on the identification information associated with a particular social device. Further, menu views may have varying degrees of granularity as contextually appropriate or as determined by the support service provider or user of the device.

Following selection of one or more desired support services, authorized servicing information relating to such services is exchanged between the SNET/SNET group and the social device in step 808. Such servicing information may comprise, for example, warranty information, device activation information, device configuration information, device maintenance information and device testing information.

Figure 9:
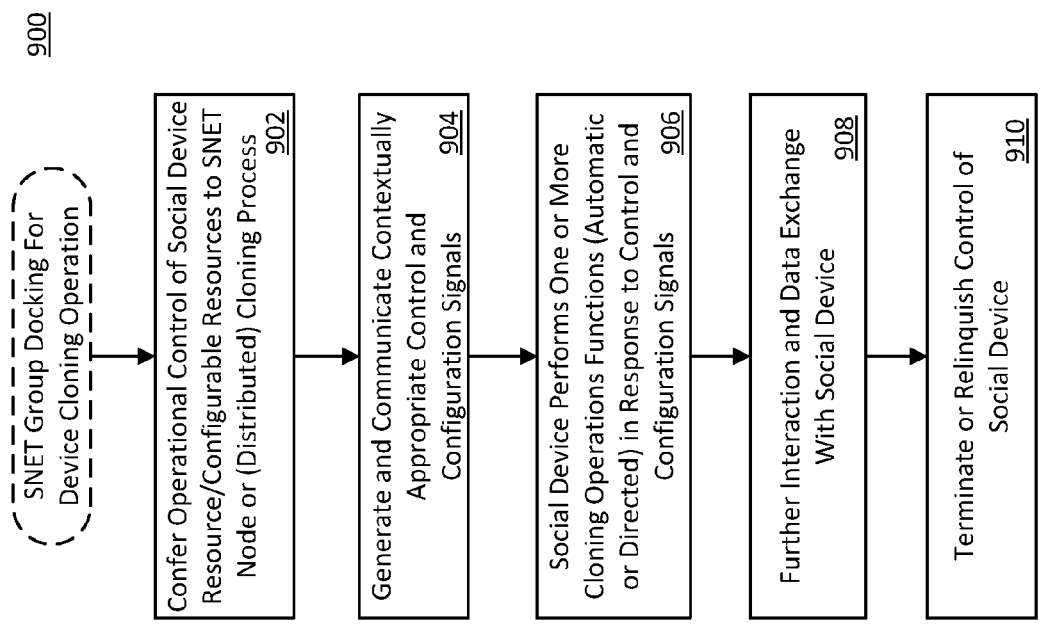
FIG. 9 is a logic diagram of a method for configuring and/or cloning a social device in accordance with an embodiment of the present disclosure.

Referring now to FIG. 9, a logic diagram is shown for a method 900 for configuring and/or cloning a social device in accordance with an embodiment of the present disclosure. In certain such embodiments, a user device is effectively "cloned" via user interaction with a SNET/group. The cloning process may expose the application and environment of one user's device to other users in a SNET group. Cloning may be conducted at multiple levels, including complete cloning of similar devices (including, for example, an operating system (OS), application environment, look-and-feel, GUIs, etc.). Alternatively, cloning may comprise copying one or more of: an OS, an OS and applications, an OS plus applications and data, a specific application and associated data (wherein data could be content and/or user settings), etc.

In operation, newer versions of an underlying OS or applications that are available from the source device, or that are already installed on the cloned device, may trigger a user authorization prompt (on either the source or cloned device) before overwriting or installation of older versions. Cloning procedures can involve full device-to-device data exchange, support redirection to an original source for download, purchase, and registration interaction, or a combination thereof. By way of example, a user might configure a new tablet device by cloning/copying a previously docked tablet device, including all prior data (telephone numbers and other contact information, etc.), settings, media content and libraries, and installed applications. Such a procedure may be applied to many types of social devices, including smart phones, social "robots" and avatars. Security procedures may be employed as necessary to protect data exchanges involving secure devices. Further, fallback or reversion data may be stored locally or in storage associated with a SNET.

In other embodiments, a temporary cloning operation may be used. For example, a human may own multiple smart phones, one of which is primarily used during travel. The owner may decide to lend this phone to a companion or family member who is authorized to temporarily install configuration information and data associated with all or a portion of his/her own phone.

In the exemplary cloning operation 900, upon activating or docking a social device, account and/or device information is automatically (or via a setup-up prompt) provided to the SNET group. Next, in step 902, operational control of the social device or certain configurable resources of the social device is conferred to a node of or cloning process supported by the SNET group. This node or process then generates contextually appropriate control and configuration signals as shown in step 904. Such control signals and related cloning data are communicated to the social device, possibly via a standardized communication protocol.

In response to the control signals, the social device performs one or more cloning operations, either automatically or as authorized by a user, in step 906. Such operations may include, for example, extending device configuration data for use by at least a portion of the social device, the device configuration data associated with a second device affiliated with a SNET group. Further interaction and data exchange with the social device resource may occur in step 908. In subsequent step 910, control of the social device resource is terminated or relinquished to a user or other SNET node.

Figure 10:
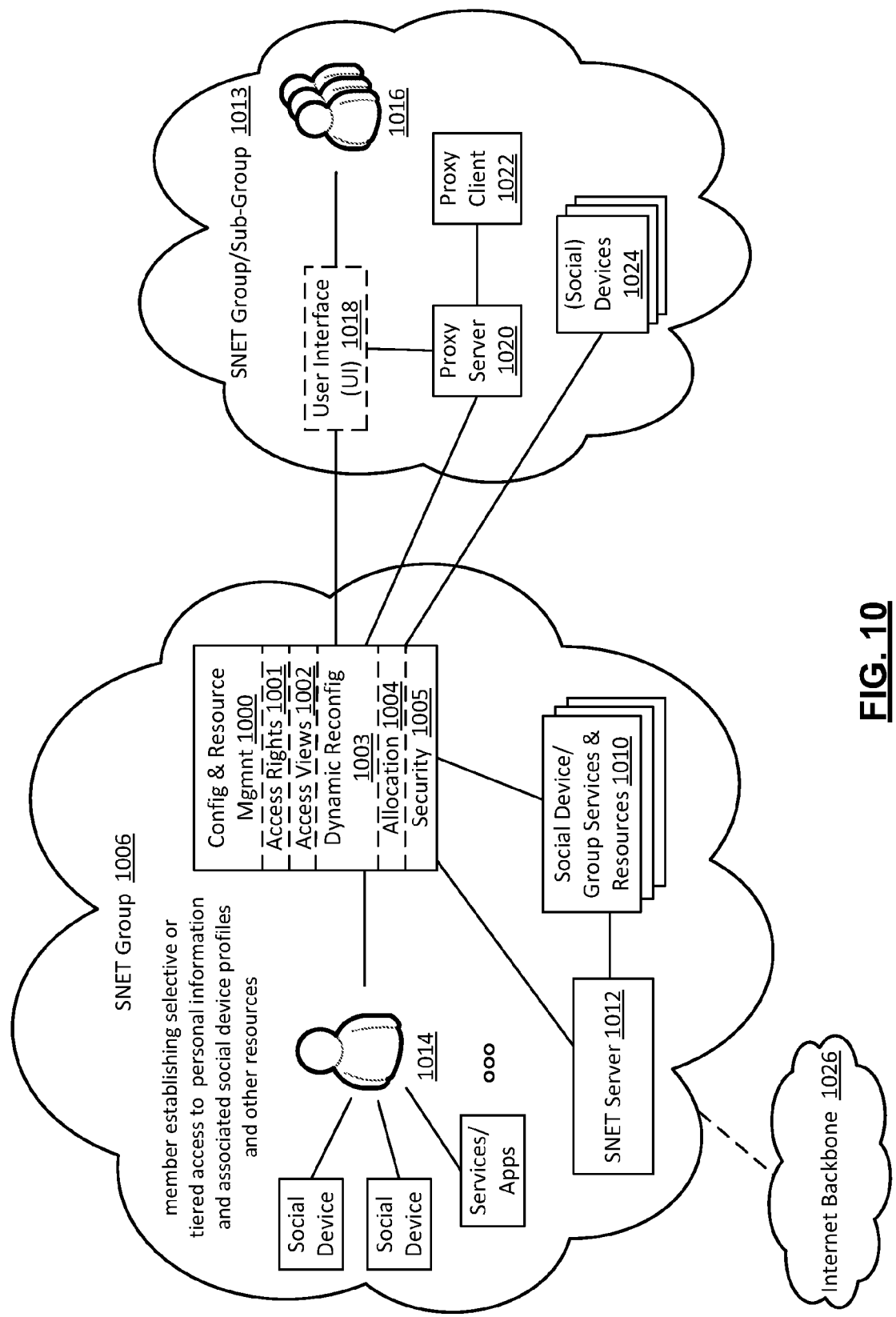
FIG. 10 is a schematic block diagram illustrating access to social services and other resources participating in a social network group/sub-group in accordance with an embodiment of the present disclosure.

FIG. 10 is a schematic block diagram illustrating access to social services and other resources 1010 participating in a social network group/sub-group 1006 in accordance with an embodiment of the present disclosure. In this embodiment, a member of a social group controls different access levels to both personal information (which may be included in a user profile) and associated device profiles and configurable capabilities. Such access rights allow the member to establish selective, restricted and/or tiered access rights and views—for other members of the social/group as well as non-members—to all or some of the member's social devices, services and other resources.

In the illustrated embodiment, a member or device of a SNET group 1006 (or, alternatively, an unaffiliated entity or node of SNET group/sub-group 1013) accesses social group services and resources 1010 associated with the SNET group 1006 via a configuration and resource management node 1000. The configuration and resource management node 1000 of this embodiment comprises access rights 1001, access views 1002, dynamic (re)allocation functionality 1003, allocation functionality 1004, and security functionality 1005.

In operation, the access rights 1001 and access views 1002 control differing access levels and access visibility for social (support) services, device information, a member's personal information, data, services, processing and storage capabilities, and other social resources. Access rights 1001 and access views 1002 can be predefined, for example, based on a SNET group, based on co-member devices, or based on member's own device to device interactions. Such predefinition can be tailored dynamically as needed or as relationships change. Access rights 1001 may also be expanded to support temporary interaction with a guest member or visitor device. For example, a visiting member with a smart phone may be permitted to receive/provide support service affiliated with a "home group."

In some embodiments, a member of the SNET group 1006 can adjust and modify access rights 1001 on an information-by-information basis, device-by-device basis, member-by-member basis, etc. Through access views 1002, the member might also present itself in various ways depending on context, location, or use-based considerations. For example, a member icon/avatar may present differing characteristics or capabilities that are context dependent, including work, home or social settings. Allocation and (as necessary) dynamic reallocation of social services/resources is performed by dynamic (re)allocation functionality 1003 and allocation functionality 1004. Access to social services/resources can be preconditioned on secure access/authentication performed by security functionality 1005.

In addition to social group services and resources 1010, the SNET group 1006 might include, for example, a SNET server 1012 and one or more human (or AI personas/functions) members 1014 and affiliated social devices, services, applications, files, web pages, connections and other social resources. As will be appreciated, a human member 1014 can establish selective or tiered access to personal information and associated social device profiles and other resources as described above. In certain embodiments, the configuration and resource management node 1000 may be incorporated in system circuitry of a SNET (proxy) server 1012 or other SNET social device, or administered by a SNET hosting infrastructure, either in a standalone or distributed manner. Further, the SNET server 1012 may include a firewall operable to provide secure access and perform basic routing functions.

Access to social group support services and resources 1010 by nodes of the SNET group/sub-group 1013 may occur in a variety of ways, including via a user interface (UI) 1018 utilized by one or more humans 1016. The UI 1018 might comprise a graphical user interface (GUI) or browser that graphically indicates available support services, etc. Access to the SNET group 1006 can also be managed by a proxy server 1020. The proxy server 1020 functions as an intermediary for access requests from proxy clients 1022—including social services and/or devices connected to the proxy server 1020 via the Internet or other IP-based networks—seeking to communicate with the SNET group 1006. Social devices 1024 affiliated with a SNET group/sub-group 1013 may have the capacity to interact directly with the SNET group 1006. It is noted that the human members 1016, proxy server 1014 and social devices 1024 may operate independently of a SNET group/sub-group. Further, the proxy server 1014 may be a distributed or cloud-based entity, or a member of (or incorporated in a member of) either the SNET group/sub-group 1013 or SNET group 1006.

Figure 11:
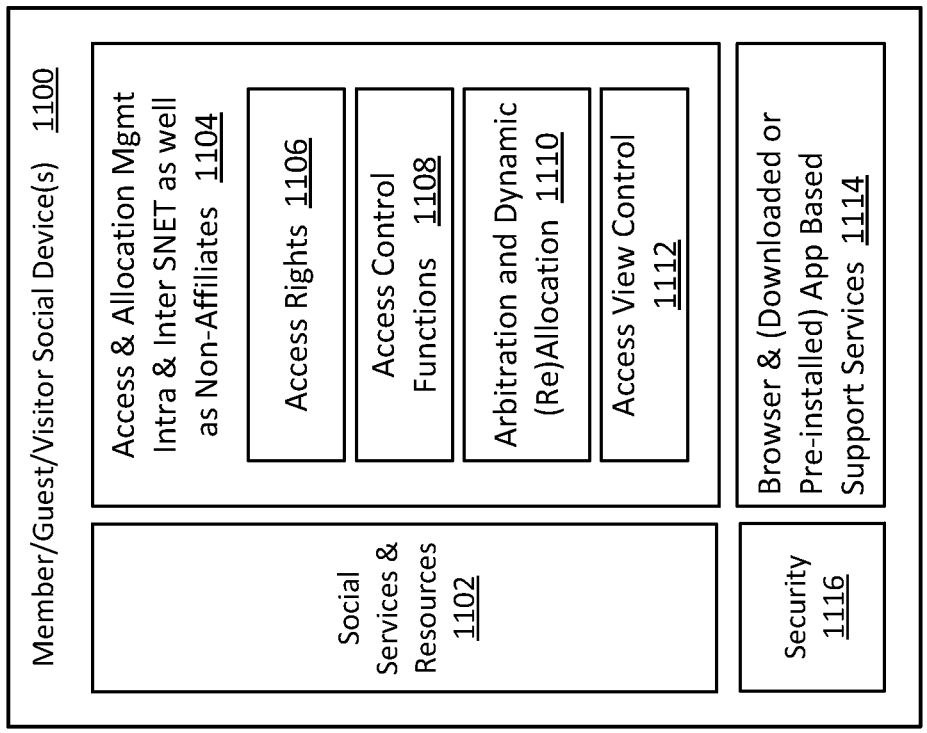
FIG. 11 is a schematic block diagram of an embodiment of a social device comprising integral social service and resource access management functionality in accordance with various embodiments of the present disclosure.

FIG. 11 is a schematic block diagram of an embodiment of a social device(s) 1100 comprising integral social service and resource access management functionality in accordance with various embodiments of the present disclosure. The social device 1100 may operate as a member, guest member, and/or and authorized visitor of the SNET. Access to and allocation of social services and resources 1102 of the social device 1100 is controlled by (predefined or user-defined) access and allocation management functionality 1104, operation of which may apply to intra- and inter-SNET membership nodes, as well as interactions between the social services and resources 1102 and non-affiliated entities. Further, access and allocation management functionality 1104 may be distributed between one or more social devices/SNET hosting infrastructures.

The access and allocation management functionality 1104 comprises access rights 1106, access control functions 1108, arbitration and dynamic (re)allocation 1110, and access view control 1112. Exemplary operation of such functions is described in conjunction with various other Figures herein.

Servicing of requests for access to social services and resources 1102 may be carried out, for example, via a browser and/or downloaded or preinstalled support services 1114. In certain embodiments, access to social services and resources 1102 is conditioned upon authentication or security operations 1116. In addition, various functional blocks of the social device 1100 may be incorporated into one or more integrated circuit devices, which may be dedicated to support a primary user and/or shared access operations.

Figure 12:
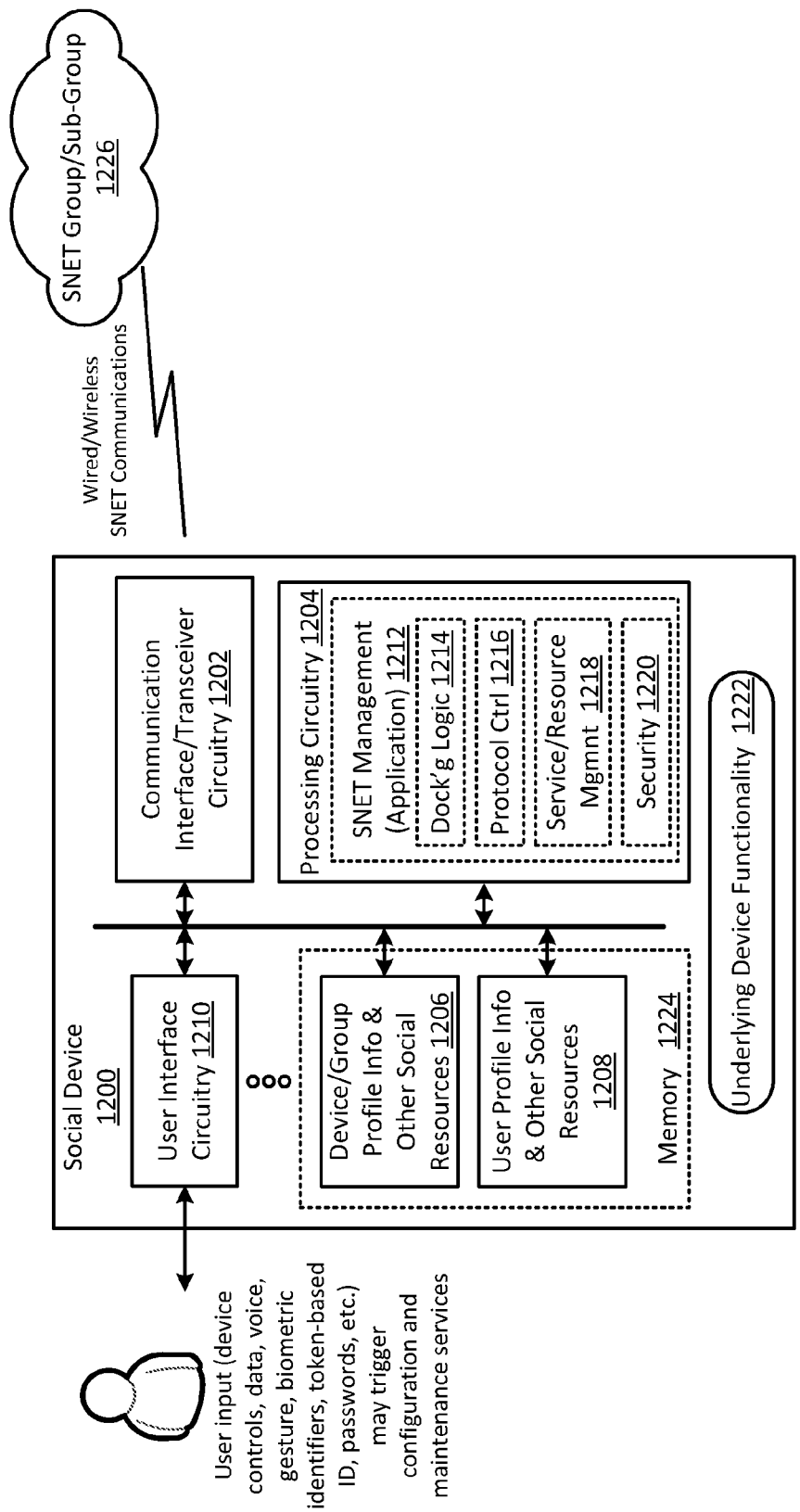
FIG. 12 is a schematic block diagram of an embodiment of a social device comprising integral functionality operable to support social network group/sub-group membership and communications in accordance with the disclosure.

FIG. 12 is a schematic block diagram of an embodiment of a social device comprising integral functionality operable to support social network group/sub-group membership and communications in accordance with the disclosure. In the illustrated embodiment, a communication interface and transceiver circuitry 1202 is operable to perform wired or wireless communications between the social device 1200 and a SNET group/sub-group 1226 over one or more communication channels. Depending on the capabilities and configuration of the social device 1200, communications with a SNET may be unilateral or bidirectional/interactive, and utilize either a proprietary or standardized communication protocol. Communications may include, for example, device profile information, user and SNET group profile information, servicing information, control signals, audio/video content, interactions with hosted service data, user data, relayed information, etc.

The social device 1200 further includes processing circuitry 1204 operable to process and manage communications, services and associations between the device and other entities including members of a SNET group/sub-group 1226, third parties, software agents, etc. More particularly, the processing circuitry 1204 may include, for example, a software management application 1212 comprising one or more of docking logic 1214 (including support for device discovery and configuration protocols such as described below), communication protocol control 1216, service and resource management 1218, and security/authentication 1220 functionality.

The social device 1200 further may utilize that may take many forms and be maintained in static or dynamic memory 1224. Such profile information enables a social device and/or user to present an image of itself and its capabilities to other members of a SNET. In particular, device/group profile information and other resources 1206 and user profile information 1208 may be utilized in various ways in accordance with the disclosure to facilitate a variety of social interactions. Depending on the capabilities and requirements of a particular device (and other members of a SNET), a device or user profile may be static or dynamic.

In certain embodiments, the social device 1200 may interact with a user(s) via user interface circuitry 1210. User input to the social device 1200 may include, for example, data entry through a keypad, touchscreen, remote control device, gaming controller, device control buttons, voice or gesture commands, storage device, etc. For example, voice or gesture commands may be utilized to trigger intelligent services. Authorized access to or control of the social device 1200 can be facilitated through unique biometric identifiers, passwords, token-based identification, trusted authorities or documents such as a driver's license or passport, and like authentication means.

The social device 1200 may perform core or underlying functionality 1220 (e.g., a social appliance, security device, vehicular communication node, etc.). Alternatively, the social device may primarily function as a social networking interface or communication device, or be programmable to perform specific functions within a SNET group/sub-group.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, procesing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus for a social networking system supporting interactions between a member of a social network group and a social device, the social device accessible by the social network group, the apparatus comprising:
   interface circuitry to couple with the social networking system; and
   social network processing circuitry coupled to the interface circuitry to support the interactions between the member of the social network group and the social device, the social network processing circuitry hosting the social network group, the social network processing circuitry operable to provide:
   a docking service that manages docking of the social device to participate in the social network group based upon a membership request for access to the social network group and resources, the docking service to provide the member of the social network group with up to and including full remote control over a service of the social device, as facilitated by the membership request, via the social network processing circuitry; and
   a support service docked on the social network group and accessible by the social network group via the social network processing circuitry, the support service including resource utilization, tracking, and reporting services based on at least one of detection or monitoring of technology and media usage by the member over the social network group, the support service exchanging servicing information with the social device via the social network group upon docking of the social device with the social network group, the servicing information relating to servicing the social device with the member and providing a hierarchical association having a plurality of tiers of the social networking system and being relative to the social network group.

2. The apparatus of claim 1, at least a portion of the servicing information selected from the group consisting of:
   warranty information, device activation information, device configuration information, device maintenance information and device testing information.

3. The apparatus of claim 1, wherein the support service runs on the social network processing circuitry.

4. The apparatus of claim 1, wherein the support service runs on a device member of the social network group.

5. The apparatus of claim 1, wherein the support service is a cloning service, the cloning service extending device configuration data for use by at least a portion of the social device, the device configuration data associated with another social device affiliated with the social network group.

6. The apparatus of claim 1, wherein the support service provides an interface that offers the social device a plurality of services, each of the plurality of services involving distinct servicing information.

7. The apparatus of claim 1, wherein the servicing information is based, at least in part, upon identity information associated with the social device.

8. A method for performing configuration of a social device via support servicing capabilities of a social network group, the method comprising:
provizing social device identification information of the social device, wherein the social device identification information relating services afforded by the social device via the social network group and providing a hierarchical association of the social device relative to the social network group;
establishing an association between the social device and the social network group such that a member of the social network group has up to and including full remote control of the social device as permitted by the social device identification information as relating to the services afforded by the social device and the hierarchical association;
selecting a support service operation based, at least in part, on the social device identification information, wherein the support service operation includes resource utilization, tracking and reporting services based on at least one of detection or monitoring of technology and media usage by the social device over the social network group; and
exchanging servicing information relating to the support service operation and the hierarchical association of the social device.

9. The method of claim 8, wherein establishing an association between the social device and the social network group comprises docking of the social device as a member of the social network group.

10. The method of claim 9, wherein docking of the social device as a member of the social network group comprises providing the social device identification information to a node of the social network group, the social device identification information provided automatically upon activation of the social device.

11. The method of claim 8, at least a portion of the servicing information selected from the group consisting of:
warranty information, device activation information, device configuration information, device maintenance information and device testing information.

12. The method of claim 8, wherein the support service operation is a cloning operation, the cloning operation extending device configuration data for use by at least a portion of the social device, the device configuration data associated with another social device affiliated with the social network group.

13. The method of claim 8, wherein selecting a support service operation further comprises selecting one of a plurality of available support service operations offered by a user interface.

14. The method of claim 8, wherein the support service operation is a device activation operation, the servicing information comprising input from a user associated with the social device.

15. The method of claim 8, wherein the support service operation collects usage information regarding a resource provided by the social device.

16. Device circuitry of a social device used to interact with a social network system hosting at least one social group, the device circuitry comprising:
interface circuitry operable to couple with the social network system;
processing circuitry coupled with the interface circuitry to support interaction with a social service associated with the at least one social group, the social service including resource utilization, tracking, and reporting services based on at least one of detection or monitoring of technology and media usage by a member over the at least one social group, wherein the member of the at least one social group having up to and including full remote control of the device circuitry via the interface circuitry, as permitted by the device circuitry; and
the interaction including an exchange of device servicing information via the interface circuitry, the device servicing information relating to servicing the social device and providing a hierarchical association of the device circuitry relative to the at least one social group for activation of the device circuitry.

17. The device circuitry of claim 16, the processing circuitry configured to perform an automated social group membership operation, via the interface circuitry, upon activation of the device circuitry.

18. The device circuitry of claim 17, the automated social group membership operation comprising communication of social device identification information to the social network system.

19. The device circuitry of claim 16, further comprising:
a configurable device resource coupled to the processing circuitry,
the device servicing information comprising configuration data applicable to the configurable device resource.

20. The device circuitry of claim 16, at least a portion of the device servicing information selected from the group consisting of:
warranty information, device activation information, device maintenance information and device testing information.

* * * * *